United States Patent [19]

Masuda et al.

[11] 4,117,523
[45] Sep. 26, 1978

[54] MAGNETIC SENSOR HAVING A HOLLOW HOUSING SEALED WITH A SHIELD CAP

[75] Inventors: Noboru Masuda, Kawaguchi; Yu Nishino, Yokohama; Hiroaki Kase, Machida, all of Japan

[73] Assignee: Denki Onkyo Co., Ltd., Tokyo, Japan

[21] Appl. No.: 767,311

[22] Filed: Feb. 10, 1977

[30] Foreign Application Priority Data

Feb. 10, 1976 [JP] Japan ................................. 51-13414
Feb. 10, 1976 [JP] Japan ............................ 51-14270[U]

[51] Int. Cl.$^2$ .......................... G11B 5/22; G11B 5/20; G11B 5/10
[52] U.S. Cl. ................................... 360/110; 360/122; 360/123; 360/129
[58] Field of Search ............... 360/110, 112, 113, 129, 360/122, 123; 338/32; 329/198–200; 324/45–46

[56] References Cited

U.S. PATENT DOCUMENTS

| | | | |
|---|---|---|---|
| 3,143,714 | 8/1964 | Evans et al. | 360/112 |
| 3,209,078 | 9/1965 | Neuman | 360/112 |
| 3,493,694 | 2/1970 | Hunt | 360/113 |
| 3,495,048 | 2/1970 | Gooch | 360/125 |
| 3,527,899 | 9/1970 | Oliver et al. | 360/125 |
| 3,710,360 | 1/1973 | Flachsbarth | 360/112 |

*Primary Examiner*—Alfred H. Eddleman
*Attorney, Agent, or Firm*—Armstrong, Nikaido, Marmelstein & Kubovcik

[57] ABSTRACT

A magnetic sensor includes a housing in which flux producing means which comprises an electromagnet or a permanent magnet is received. A pair of magnetoelectric transducer elements are secured to a surface of the flux producing means which represents a magnetic pole, with a given spacing between the elements. In order to dispose the magnetoelectric transducer elements as close as possible to the outer surface of the housing, the latter is formed with a through opening at a corresponding position. The through opening is covered by a thin shield cap to protect the magnetoelectric transducer elements from a member being detected which is passed in sliding contact with or very close to the outer surface of the housing and to provide an enclosed construction for the housing.

13 Claims, 13 Drawing Figures

4,117,523

MAGNETIC SENSOR HAVING A HOLLOW HOUSING SEALED WITH A SHIELD CAP

BACKGROUND OF THE INVENTION

The invention relates to a magnetic sensor employing magnetoelectric semiconductor transducer elements, and more particularly to a magnetic sensor which may be used for reading a magnetic pattern representing characters or symbols magnetically printed on a printed matter.

Sensors of both electromagnetic coil type and magnetoelectric transducer type are available for reading a magnetic pattern impressed or printed using a magnetic ink or other material containing magnetizable component. A sensor of the electromagnetic coil type is subject to a large variation in its output in response to a change in the gap between the printed surface and the sensor surface or when the speed of movement is changed, thus requiring a feed mechanism of high accuracy for the printed matter. In addition, such sensor requires that the printed matter be fed in a manner such that the printed surface is directed toward the sensor surface. Also, the either side of the printed matter must be determined, and the direction of feeding must be specified.

The sensor of magnetoelectric transducer type undergoes a small variation in the output when the gap between the printed surface and the sensor surface varies, allowing a simplified feed mechanism to be employed. It is unnecessary to determine either side of the printed matter or to specify the direction of feeding. Furthermore, the speed of movement of the printed matter need not be considered. However, magnetoelectric transducer elements formed of a semiconductor material respond to a leakage flux of a high frequency such as emanating from an electric motor or the like by producing noises which are interspersed with the output. A rapid change in the temperature of the elements results in a low frequency drift in the output response, thus preventing the achievement of a high S/N ratio. When subjected to a pressure or impact externally, the piezoelectric effect of the elements produces noises superimposed with the output pulse, which may cause a wrong operation of the sensor circuit.

Such magnetic sensors find an extensive application and hence are used under varying conditions. In particular, magnetoelectric transducer elements are susceptible to a rapid change in the temperature, the deposition of magnetic dusts, an external pressure or impact, and the influence of moisture, water or salt, which may cause a variation in the output voltage, the generation of noises and a decrease in the usefull life. To provide an arrangement which permits a magnetic sensor to be used under the conditions mentioned above, it is necessary to provide an enclosed structure. However, magnetoelectric transducer elements may not be contained in a housing having a thick wall in order to increase the magnetic field applied to the elements as high as possible. It is thus seen that it is desirable to dispose these elements adjacent to the outer surface of the housing. In view of this, the prior art include a housing formed with a through opening, in which the elements are disposed and sealed as by resin. However, the prior art housing has not been enclosed to a sufficient degree to withstand the described environmental influences, and has given rise to the above susceptibility with time.

SUMMARY OF THE INVENTION

It is an object of the invention to provide a novel magnetic sensor capable of distinguishing a low level, magnetic pattern with a high resolving power.

It is another object of the invention to provide a magnetic sensor which produces a stable output voltage, independently from influences of any kind, from a member being detected.

It is a further object of the invention to provide a magnetic sensor which provides a stable output voltage even in the presence of a rapid change in the temperature.

It is still another object of the invention to provide a magnetic sensor having an increased magnetic sensitivity so as to read correctly a minimal change in flux density.

It is a still further object of the invention to provide a magnetic sensor which minimizes or eliminates noise pulses interspersed with its output voltage.

It is an additional object of the invention to provide a magnetic sensor which provides a stabilized operation over a prolonged period without being subjected to the influences of environmental and weather conditions.

In accordance with the invention, a pair of magnetoelectric transducer elements such as Hall elements or magnetic resistance effect elements which respond to a magnetic field by producing an output and adhesively secured to an end face, representing a magnetic pole, of flux producing means such as an electromagnet or permanent magnet, and are received in a housing of enclosed type. The housing is formed with a through opening, which is closed by a shield cap of a thickness which is reduced to that of the housing wall. The magnetoelectric transducer elements are disposed in the region of the through opening in order to increase its sensitivity to a change in the magnetic flux from an information bearing member being detected such as magnetic films, magnetic cards, magnetic sheets or printed matters impressed or printed with an ink or paint which contains a magnetizable component while at the same time protecting the elements from the influences of the temperature of the member, the pressure from the member, magnetic dusts or moisture. The flux producing means is associated with thermal insulating means as well as means for relieving or absorbing oscillations or impacts so as to prevent a rapid change in the temperature and to prevent oscillations and impacts from being applied directly to the magnetoelectric transducer elements. In this manner, it is assured that a magnetic pattern of low level be distinguished with a high resolving power.

DESCRIPTION OF PREFERRED EMBODIMENTS

Figure 1:
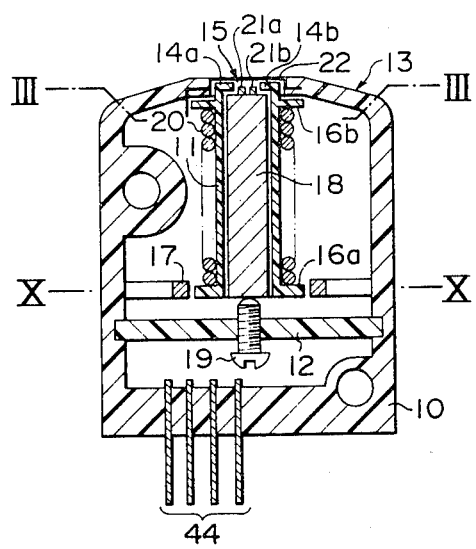
FIG. 1 is a cross section of the magnetic sensor according to the inventon.

Referring to FIG. 1, there is shown a cross section of the magnetic sensor according to the invention including a box-shaped housing 10. The housing 10 comprises a box section and a cover, forming an enclosed construction formed of a thick wall. A cylindrical coil bobbin 11 is mounted on a printed circuit board 12 within the housing 10. The housing 10 includes a sensor surface 13, which is formed with a through opening 15, in which a pair of guide ribs 14a, 14b formed on the bobbin 11 is a close fit. The housing 10 is internally formed with a support 17, which controls the position of the bobbin 11 by receiving a flange 16a formed at the lower end of the bobbin 11 therein. The printed circuit board 12 is secured to the housing so as to extend in a direction perpendicular to the length of the bobbin 11. A magnetic column 18 of cylindrical form is received inside the coil bobbin 11 and projects slightly above the level of another flange 16b formed adjacent to the upper end of the bobbin and extends into abutment against the guide ribs 14a, 14b. A screw 19 engaging the board 12 and connected with one of terminals 44 for purposes of electrical earth connection and thermal connection bears against the lower end of the column 18 and urges it toward the through opening 15, thus maintaining it in a position for optimum sensitivity. An electromagnetic coil 20 for magnetizing the magnetic column 18 is disposed on the bobbin 11. In the region of the guide ribs 14a, 14b, a pair of magnetoelectric transducer elements 21a, 21b are adhesively secured to the end face of the magnetic column 18, and are protected by a shield cap 22 which covers the through opening 15. In the description to follow, the elements 21a, 21b are assumed to be magnetic resistance effect elements. The shield cap 22 is formed of a non-magnetic material, and is disposed in coplanar relationship with the sensor surface 13 to seal the through opening 15, thus protecting the elements 21a, 21b from the influence of the temperature of a member being detected, external impacts, magnetic dusts, moisture or water and salt damage. Heat shielding effect is enhanced by forming the shield cap of a high thermal conductivity material such as ceramic and providing a heat conducting path. By way of example, the shield cap may be formed of an electrically conductive material such as phosphor bronze, beryllium copper, brass, nickel silver or the like and may be connected with the ground through a lead wire to provide an electrostatic shielding effect.

Figure 2:
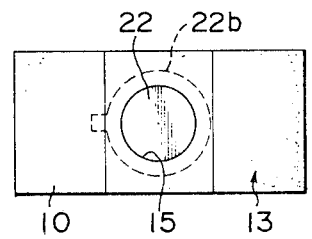
FIG. 2 is a plan view of the sensor surface.
Figure 3:
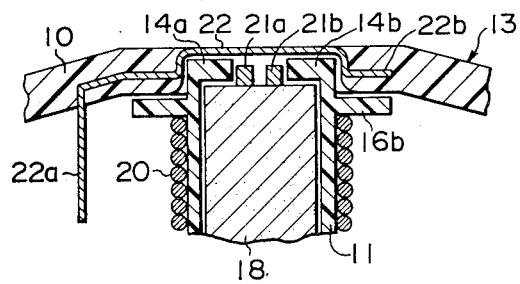
FIG. 3 is a fragmentary cross section, to an enlarged scale, taken along the line III—III shown in FIG. 1.

As shown in FIGS. 2 and 3, the shield cap 22 is in the form of an inverted ash tray, having a flange 22b which is embedded into the wall of the housing 10 as the latter is molded, by placing it inside the molding die. In this manner, a perfect seal of the opening 15 as well as the hermetic seal of the housing interior is assured. The shield cap 22 is also formed with a terminal piece 22a which projects from the wall into the interior of the housing 10 and which is connected with one of the terminals 44 through a lead wire.

With the arrangement described, any impact or thermal cycle applied to the shield cap 22 prevents its dislodgement from the opening 15. The placement of the elements 21a, 21b adjacent to the exterior surface of the housing 10 permits them to be highly responsive to a change in the flux density. The provision of the cap prevents a deposition of magnetic dusts on the elements 21a, 21b or a contact of these elements with a moisture. The protection of the magnetoelectric transducer elements by the shield cap prevents a direct contact of unevenness or creases in the member being detected with these elements, and also prevents a direct transmission of impacts, which may result from a bouncing of a feed roller against the shield cap, to the elements, thus avoiding the occurrence of impulse-shaped noises.

If the member being detected which passes in sliding contact with or close to the sensor surface 13 has a local variation in the surface temperature or if the member has an increased temperature difference with respect to the elements, an increased heat capacity of the shield cap 22 or the heat conducting path connected therewith prevents their adverse influence upon the elements. The guide ribs 14a, 14b are formed of a low thermal conductivity material, for example, nylon, polyacetal resin or the like, thereby isolating the elements from a temperature fluctuation of the member being detected. In addition, since the elements 21a, 21b are directly and adhesively secured to the magnetic column or magnet, they are principally under thermal influence of the column or magnet having an increased heat capacity, so that a local variation in the temperature of the member being detected does not result in a rapid change in the temperature of the elements, even if the arrangement is such that a temperature variation of the member is permitted to be transmitted to the elements. As a result, neither low frequency drift nor impulse-shaped noises occur in the output. Lead wires from the electromagnetic coil 20 and the magnetoelectric transducer elements 21a, 21b are connected with appropriate areas on the printed circuit board 12, which is then connected with respective terminals 44 embedded in the wall of the housing 10.

The shield cap 22 isolates the magnetic resistance effect elements 21a, 21b from the external influences of various kinds as mentioned above, and the guide ribs 14a, 14b and the flange 16b of the coil bobbin 11 maintain the elements 21a, 21b at a given distance from the shield cap 22, again providing a thermal isolation from the shield cap 22. By choosing a suitable size for the flange 22b, the shield cap 22 may be provided with any desired heat capacity, so that a rapid temperature change occurring in the member being detected may be prevented from being transmitted to the elements 21a, 21b.

Figure 4:
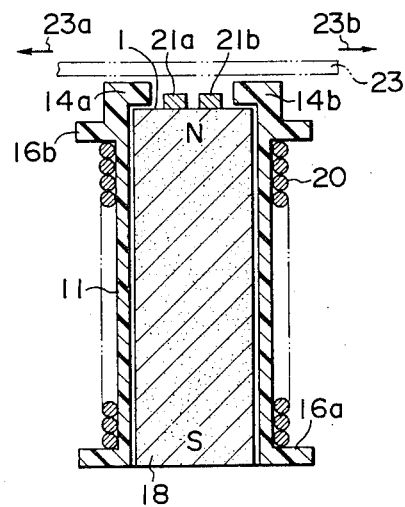
FIG. 4 is an enlarged view of the coil bobbin and the magnetic column shown in FIG. 1.
Figure 5:
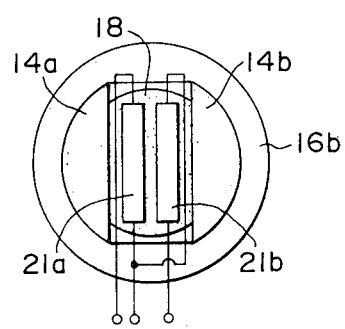
FIG. 5 is a plan view showing the array of magnetoelectric transducer elements shown in FIG. 1.

FIGS. 4 and 5 are an enlarged cross section and a plan view of the coil bobbin assembly. Parts corresponding to those shown in FIG. 1 are designated by like reference characters. As mentioned above, the magnetic column 18 is maintained in abutment against the pair of semi-circular guide ribs 14a, 14b, and has its end face partly exposed through the space between the guide ribs 14a and 14b. The pair of magnetic resistance effect elements 21a, 21b are adhesively secured to the exposed end face of the column in parallel relationship with the guide ribs 14a, 14b. The guide ribs 14a, 14b and the coil bobbin 11 are molded from a low thermal conductivity material such as a suitable resin, and the guide ribs 14a, 14b have a height which is slidhtly greater than the thickness of the magnetic resistance effect elements 21a, 21b. Thus, when these elements are placed into the opening 15 of the housing 10 as shown in FIG. 3, the elements are maintained at a given distance from the shield cap 22, whereby they are protected from heat or impact which may be applied from a member 23 being detected which is fed in either direction indicated by arrows 23a, 23b relative to the shield cap 22.

The magnetic column 18 comprises a magnetically anisotropic material, i.e. a hard or semi-hard magnetic material. Since a magnetically hard material requires for its magnetization an ampere turn which is approximately five times the coercive force, a material having a coercive force on the order of 300 to 800 Oersted is used in order to minimize the heating of the electromagnetic coil. A magnetically semi-hard material may be subject to demagnetization upon impact, and therefore, once magnetized, it must be used while avoiding the application of impacts. Alternatively, it may be magnetized after impacting.

In use, a current pulse is passed through the coil 20 to magnetize the magnetic column 18 as the member 23 being detected passes over the magnetic resistance effect elements 21a, 21b. Subsequently these elements are maintained under the action of the magnetic field even if the coil 20 is deenergized. After passage of the member 23 being detected, an a.c. current is passed through the coil 20 for demagnetization. Thus, as compared with an arrangement in which current flow through the coil 20 is maintained continuously, a temperature rise is reduced. In addition, the demagnetization prevents a deposition of magnetic dusts during the time when a member being detected is not passed over the apparatus.

Figure 6:
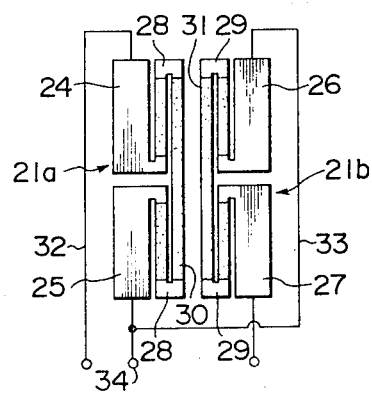
FIG. 6 is a schematic view showing the arrangement and the wiring of the pair of magnetic resistance effect elements.

The pair of magnetic resistance effect elements 21a, 21b which are disposed parallel to each other are electrically connected so as to cancel any noise produced. By way of example, FIG. 6 shows an exemplary arrangement of the elements 21a, 21b. Electrodes 24, 25, 26, 27 and conductor portions 28, 29 are shown hatched while magnetically responsive sections 30, 31 are shown dotted. The elements 21a and 21b are formed in a symmetrical configuration and are formed of a single chip so as to have an equal area. A lead wire 32 connected with the electrode 24 is disposed substantially in symmetrical manner with respect to a lead wire 33 which provides an interconnection between the electrodes 25 and 26, and a power source is connected between the lead wire 32 and the electrode 27. These lead wires may be formed by evaporation. Thus, a voltage produced in response to an external magnetic field is cancelled within the elements 21a, 21b in accordance with the ratio of their resistance values, minimizing the noise level which appear at an output terminal 34.

Figure 7:
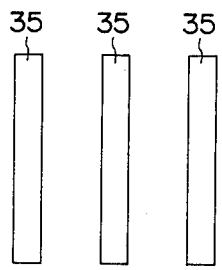
FIG. 7 is an illustration of a representative magnetic pattern printed on a paper.
Figure 8:
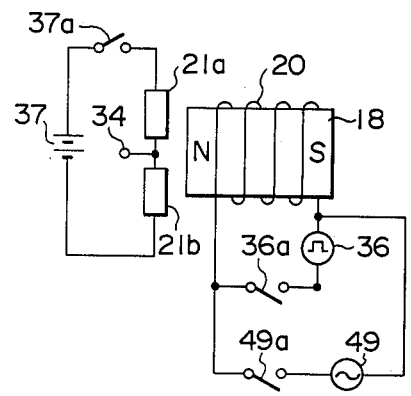
FIG. 8 is a schematic view showing the use of the apparatus according to the invention.

The member 23 being detected is directed for movement in a direction perpendicular to the parallel array of the magnetic resistance elements 21a, 21b, and the spacing between the magnetically responsive sections 30, 31 and their width are chosen such that each rectilinear element, as shown at 35 in FIG. 7, of the magnetic pattern on the member 23 alternately activates the magnetically responsive sections 30, 31 of the magnetic resistance effect elements 21a, 21b. By this arrangement, there is obtained an output having a high peak value from the output terminal 34.

Figure 9:
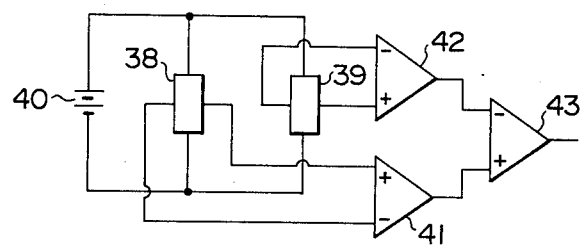
FIG. 9 is a circuit diagram of a circuit arrangement of an embodiment of the invention in which a pair of Hall elements are used.

In use, the coil 20 is connected across a series combination of a pulse source 36 and a switch 36a, and is also connected with another series combination of an a.c. source 49 and a switch 49a. The electrodes 24, 27 of the series connected pair of magnetic resistance effect elements 21a, 21b are connected across a d.c. source 37 through a switch 37a. At the member 23 passes over the elements 21a, 21b, the switch 37a is closed to cause a current flow, and the switch 37a is opened to interrupt the current flow after the passage of the member 23. The switch 36a is closed to permit a current from the source 36 to flow through the coil 20 in order to magnetize the magnetic column 18 when the member 23 being detected is inserted into the apparatus. The switch 49 is closed after the member 23 has passed the sensor surface 13 to cause a current flow from the a.c. source 49 to demagnetize the magnetic column 18. In this manner, a magnetic field is applied to the elements 21a, 21b and a current flow is established therein as the member 23 is fed. The passage of the magnetic pattern comprising the elements 35 alters the magnetic field which is applied to the elements 21a, 21b, and a resulting variation is derived as an output voltage from the terminal 34.

Where the removal of magnetic dusts or powder can be easily achieved, the magnetic column 18 may be replaced by a permanent magnet. In this instance, the coil 20 may be dispensed with.

Where Hall elements are used as the magnetoelectric transducer elements, a pair of Hall elements are disposed in place of the magnetic resistance effect elements. Since a Hall element has a fairly linear output response, the flux density applied may be reduced than that applied to a magnetic resistance effect element. An exemplary arrangement is shown in FIG. 9 where a pair of Hall elements 38, 39 are connected in parallel with each other across a constant voltage d.c. source 40, and their output voltages are processed by operational amplifiers 41, 42, 43.

A single Hall element may be used as a magnetoelectric transducer element when it is desired to provide a proximity sensor.

Figure 10:
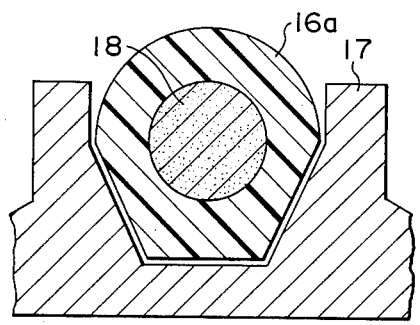
FIG. 10 is a fragmentary cross section of a modification of the arrangement shown in FIG. 1, taken along the line X—X shown in FIG. 1.

FIG. 10 is a cross section of a modification of the arrangement shown in FIG. 1, taken along a line corresponding to the line X—X shown in FIG. 1. The magnetic column 18 is fitted inside the coil bobbin 11 as a core thereof in order to avoid a mutual movement therebetween and to prevent a deformation of the coil bobbin 11 as a result of an expansion thereof caused by the heating of the energized coil 20, thus maintaining the dimensional accuracy and stability of the coil bobbin. The flange 16a at the lower end of the coil bobbin 11 is partly tapered, the tapered portion being fitted into the support 17 to prevent a rotation of the coil bobbin 11. With this arrangement, the magnetoelectric transducer elements 21a, 21b are maintained in their optimum position so that the resulting output voltage has a high resolving power and lies within a given range of magnitude.

Figure 11:
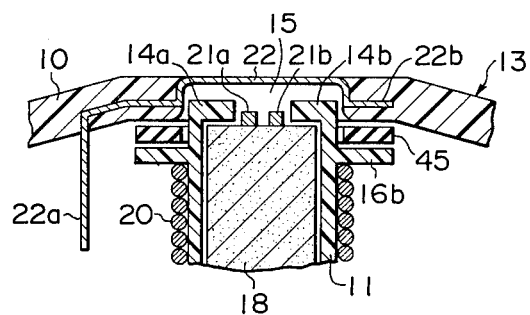
FIGS. 11 to 13 are fragmentary cross sections showing further modifications of the arrangement shown in FIG. 1, taken along the line III—III of FIG. 1.

FIG. 11 shows a modification of the arrangement shown in FIG. 11, and represents a cross section taken along a line corresponding to the line III—III shown in FIG. 1. If a magnetic card or check which represents the member 23 being detected has creases, folds, projections or a deposition of dust thereon, a feed roller for the member 23 being detected may be caused to bounce, or these irregularities may directly apply impacts or oscillations to the housing 10, thereby causing the piezoelectric effect of the magnetoelectric elements to produce impulse-shaped voltage or low frequency drift to appear in the output voltage. Specifically, where the running speed of the member being detected is slow and there is no provision for absorption of mechanical oscillations, an impulse voltage of differentiated waveform may be produced from the magnetic sensor, causing a malfunctioning thereof. On the contrary, where the running speed of the member being detected is relatively high and a mechanical integration factor is not effective, there may result an integrated waveform or so-called low frequency drift, causing a shift in the level of the signal voltage to prevent a proper functioning of the sensor circuit.

To overcome such problem, it is necessary to provide mechanical filter means which substantially reduces or absorbs impacts or oscillations. Referring to FIG. 11, there is shown an annular shock absorber 45 interposed between the housing 10 and the flange 16b of the coil bobbin 11, and the ribs 14a, 14b placed within the through opening 15 are maintained free from contact with the shield cap 22 and the inner wall of the opening 15. In this instance, the shock absorber 45 functions as a mechanical filter having an integration constant, providing an attenuation of mechanical frequencies.

Figure 12:
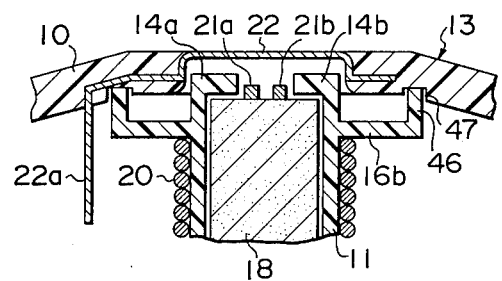

FIG. 12 shows another example of mechanical filter means. Specifically, the flange 16b of the coil bobbin 11 is formed with a cylindrical portion 46 which extends toward the sensor surface 13 and which is inserted into a circular groove 47 formed in the inner wall of the housing 10. The cylindrical portion 46 maintains the guide ribs 14a, 14b clear from the shield cap 22 and the inner wall of the opening 15. The thickness of the flange 16b and the cylindrical portion 46 is chosen so that they provide a desired spring effect. With this construction, any external impact or oscillation is transmitted to the magnetoelectric transducer element through a transmission path of a substantial length, whereby it is substantially reduced.

Figure 13:
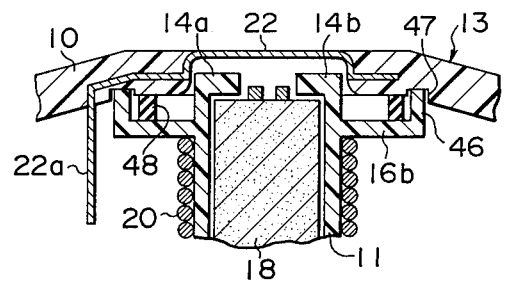

FIG. 13 shows a further improvement of the construction shown in FIG. 12 wherein a resilient absorber 48 formed of an annular rubber or coiled spring is place inside of the cylindrical portion 46. The size, thickness and elastic coefficient of the absorber 48 is chosen to produce an absorption of surface oscillations. The described construction contributes to enhance the functioning of mechanical filter in accordance with the speed of the member being detected. Thus, the oscillations which may be transmitted to the coil bobbin is further reduced, and the piezoelectric noises which may be produced when the running speed of the member being detected is very slow can be neglected.

Having described the invention in terms of specific embodiments, it should be understood that the invention is not limited thereto and various changes and modifications can be made therein without departing from the spirit of the invention. By way of example, instead of embedding the shield cap in the housing, it may be a close fit with the through opening or it may be adhesively secured.

Having described the invention, what is claimed is:

1. A magnetic sensor comprising a hollow housing, a through opening formed in the housing, a shield cap which seals the through opening, flux producing means received within the housing and having its one end which is formed as a magnetic pole located within the region of the through opening within the housing, a magnetoelectric transducer element secured to the pole face of the flux producing means which is located within the through opening, and connection means for connecting electrical terminals within the housing to the exterior thereof.

2. A magnetic sensor according to claim 1 in which the edges of the shield cap is embedded in the wall of the housing.

3. A magnetic sensor according to claim 2 in which the shield cap is formed of a material which is a good thermal conductor and has a thickness which is less than the wall thickness of the housing.

4. A magnetic sensor according to claim 1 in which the flux producing means comprises a permanent magnet.

5. A magnetic sensor according to claim 1 in which the flux producing means comprises an electromagnet.

6. A magnetic sensor according to claim 5 in which the electromagnet comprises a column of magnetizable material, a coil bobbin, and an electrical coil.

7. A magnetic sensor according to claim 6 in which the coil bobbin is formed with guide ribs located adjacent to the magnetoelectric transducer element which is secured to the end face of the column.

8. A magnetic sensor according to claim 6 in which the coil bobbin is formed with a flange which serves determining the position of the coil and which serves positioning the bobbin within the housing.

9. A magnetic sensor according to claim 6 in which the column is formed of a magnet material and the coil is connected with a pulse supply and an a.c. supply in parallel.

10. A magnetic sensor according to claim 1, further including mechanical filter means interposed between the housing and the flux producing means.

11. A magnetic sensor according to claim 10 in which the mechanical filter means comprises rubber material.

12. A magnetic sensor according to claim 10 in which the mechanical filter means comprises a spring.

13. A magnetic sensor according to claim 10 in which the mechanical filter means comprises resilient plastic material.

* * * * *